United States Patent
Huang et al.

(10) Patent No.: US 11,628,863 B1
(45) Date of Patent: Apr. 18, 2023

(54) METHODS AND APPARATUS FOR ESTIMATING AND COMPENSATING FOR WIND DISTURBANCE FORCE AT A TRACTOR TRAILER OF AN AUTONOMOUS VEHICLE

(71) Applicant: PlusAI, Inc., Cupertino, CA (US)

(72) Inventors: Xiaoyu Huang, San Jose, CA (US);
Siva Bhargav Ravella, Santa Clara, CA (US); Chaozhe He, Clarence Center, NY (US)

(73) Assignee: PlusAI, Inc., Cupertino, CA (US)

( * ) Notice: Subject to any disclaimer, the term of this patent is extended or adjusted under 35 U.S.C. 154(b) by 0 days.

(21) Appl. No.: 17/708,814

(22) Filed: Mar. 30, 2022

(51) Int. Cl.
*B60W 60/00* (2020.01)
*B60W 40/02* (2006.01)

(52) U.S. Cl.
CPC ........ *B60W 60/0023* (2020.02); *B60W 40/02* (2013.01); *B60W 2300/145* (2013.01); *B60W 2420/42* (2013.01); *B60W 2420/54* (2013.01); *B60W 2520/10* (2013.01); *B60W 2520/105* (2013.01); *B60W 2530/16* (2013.01); *B60W 2552/15* (2020.02); *B60W 2554/20* (2020.02); *B60W 2555/20* (2020.02); *B60W 2556/35* (2020.02); *B60W 2556/45* (2020.02); *B60W 2710/0605* (2013.01); *B60W 2710/30* (2013.01)

(58) Field of Classification Search
CPC ............. B60W 60/0023; B60W 40/02; B60W 2300/145; B60W 2420/42; B60W 2420/54; B60W 2520/10; B60W 2520/105; B60W 2530/16; B60W 2552/15; B60W 2554/20; B60W 2555/20; B60W 2556/35; B60W 2556/45; B60W 2710/0605; B60W 2710/30
See application file for complete search history.

(56) References Cited

U.S. PATENT DOCUMENTS

| 5,528,497 | A | * | 6/1996 | Yamamoto | B62D 6/04 701/41 |
| 11,235,768 | B2 | * | 2/2022 | Herman | G06N 3/084 |
| 2013/0302022 | A1 | * | 11/2013 | Oyama | H04N 5/23203 396/59 |

(Continued)

FOREIGN PATENT DOCUMENTS

| CN | 114096453 | A | * | 2/2022 | ............ B60W 30/14 |
| DE | 102005045891 | B3 | * | 2/2007 | ........... B60K 31/047 |

(Continued)

*Primary Examiner* — Babar Sarwar
(74) *Attorney, Agent, or Firm* — Sheppard Mullin Richter & Hampton LLP

(57) ABSTRACT

A method includes receiving, iteratively over time, sets of data including vehicle dynamics data, image data, sound data, third-party data, and wind speed sensor data, each detected at an autonomous vehicle and associated with a time period. The method also includes estimating a first wind speed and a first wind direction for each time period, in response to receiving the sets of data and based on the sets of data, via a processor of the autonomous vehicle. The method also includes iteratively modifying a lateral control and/or a longitudinal control of the autonomous vehicle based on the estimated first wind speed and the estimated first wind direction, via the processor of the autonomous vehicle and during operation of the autonomous vehicle.

25 Claims, 7 Drawing Sheets

(56) References Cited

U.S. PATENT DOCUMENTS

| | | | |
|---|---|---|---|
| 2014/0005892 A1* | 1/2014 | Bar | B62D 6/04 |
| | | | 701/41 |
| 2015/0127241 A1* | 5/2015 | Szwabowski | F02D 13/0203 |
| | | | 701/101 |
| 2017/0291600 A1* | 10/2017 | Styles | F02D 41/021 |
| 2018/0056812 A1* | 3/2018 | Hamann | B60W 50/12 |
| 2019/0138021 A1* | 5/2019 | Merzig | G05D 1/0223 |
| 2019/0187705 A1 | 6/2019 | Ganguli et al. | |
| 2020/0039523 A1* | 2/2020 | Ghasemalizadeh | B62D 6/003 |
| 2020/0207358 A1* | 7/2020 | Katz | G01C 21/3697 |
| 2020/0233439 A1* | 7/2020 | Ivanov | G08G 5/0052 |
| 2020/0234601 A1* | 7/2020 | Ivanov | G09B 29/003 |
| 2020/0317266 A1* | 10/2020 | Kunihiro | B62D 15/029 |
| 2020/0398836 A1* | 12/2020 | Wu | B60W 30/16 |
| 2021/0024069 A1* | 1/2021 | Herman | B60W 60/00274 |
| 2021/0193155 A1* | 6/2021 | Mitchell | G10L 15/02 |
| 2021/0197837 A1* | 7/2021 | Grubwinkler | G01P 5/00 |
| 2022/0126867 A1* | 4/2022 | Han | G01P 5/00 |
| 2022/0153227 A1* | 5/2022 | Srivastava | B60H 1/00978 |

FOREIGN PATENT DOCUMENTS

| | | | | |
|---|---|---|---|---|
| DE | 102017218218 A1 * | 4/2019 | | B60W 40/1005 |
| DE | 102019119350 A1 * | 1/2021 | | |
| DE | 102019119537 A1 * | 1/2021 | | |
| DE | 102019210932 A1 * | 1/2021 | | |
| WO | WO-2019073007 A1 * | 4/2019 | | B60W 40/1005 |

\* cited by examiner

METHODS AND APPARATUS FOR ESTIMATING AND COMPENSATING FOR WIND DISTURBANCE FORCE AT A TRACTOR TRAILER OF AN AUTONOMOUS VEHICLE

FIELD

The present disclosure relates to autonomous vehicle control, and more specifically, to dynamic adjustments to operational parameters of an autonomous vehicle.

BACKGROUND

Wind poses a significant risk to semi-trucks, particularly when they are carrying lighter-weight cargo. The Federal Motor Carrier Safety Administration (FMCSA) guidelines on "Hazardous Weather Conditions" warns truck drivers to take hazardous weather conditions (such as high winds) seriously.

SUMMARY

In some embodiments, a dynamic wind compensation method includes receiving, at a processor of an autonomous vehicle and at a first time, a first set of data including vehicle dynamics data, image data detected at the autonomous vehicle, sound data detected at the autonomous vehicle, third-party data, and wind speed sensor data detected at the autonomous vehicle, each associated with the first time. The method also includes estimating, in response to receiving the first set of data and based on the first set of data, and via the processor of the autonomous vehicle, a first wind speed and a first wind direction. The method also includes modifying, via the processor of the autonomous vehicle and during operation of the autonomous vehicle, at least one of a lateral control of the autonomous vehicle or a longitudinal control of the autonomous vehicle based on the estimated first wind speed and the estimated first wind direction. The method also includes receiving, at the processor of the autonomous vehicle and at a second time after the first time, a second set of data including vehicle dynamics data, image data detected at the autonomous vehicle, sound data detected at the autonomous vehicle, third-party data, and wind speed sensor data detected at the autonomous vehicle, each associated with the second time. The method also includes estimating, in response to receiving the second set of data and based on the second set of data, and via the processor of the autonomous vehicle, a second wind speed and a second wind direction. The method also includes modifying, via the processor of the autonomous vehicle and during the operation of the autonomous vehicle, at least one of the lateral control of the autonomous vehicle or the longitudinal control of the autonomous vehicle based on the estimated second wind speed and the estimated second wind direction.

In some embodiments, a wind compensation method includes receiving, at a processor of an autonomous vehicle, a set of data including at least two of: vehicle dynamics data, image data detected at the autonomous vehicle, sound data detected at the autonomous vehicle, third-party data, or wind speed sensor data detected at the autonomous vehicle, each associated with the first time. The method also includes estimating, via the processor of the autonomous vehicle, a wind speed and a wind direction based on the set of data, using at least one of a voting process or a sensor fusion algorithm. The method also includes modifying, via the processor of the autonomous vehicle and during operation of the autonomous vehicle, at least one of a lateral control of the autonomous vehicle, a longitudinal control of the autonomous vehicle, or a route of the autonomous vehicle, based on the estimated wind speed and the estimated wind direction.

In some embodiments, a non-transitory, processor-readable medium stores processor-executable instructions to cause a processor to receive, at an autonomous vehicle and during operation of the autonomous vehicle, a set of data The set of data includes at least two of: vehicle dynamics data, image data detected at the autonomous vehicle, sound data detected at the autonomous vehicle, third-party data, or wind speed sensor data detected at the autonomous vehicle, each associated with the first time. The non-transitory, processor-readable medium also stores processor-executable instructions to cause the processor to estimate a wind speed and a wind direction based on the set of data, using at least one of a voting process or a sensor fusion algorithm. The non-transitory, processor-readable medium also stores processor-executable instructions to cause the processor to modify, during operation of the autonomous vehicle, at least one of a lateral control of the autonomous vehicle, a longitudinal control of the autonomous vehicle, or a route of the autonomous vehicle, based on the estimated wind speed and the estimated wind direction.

DETAILED DESCRIPTION

Figure 1:
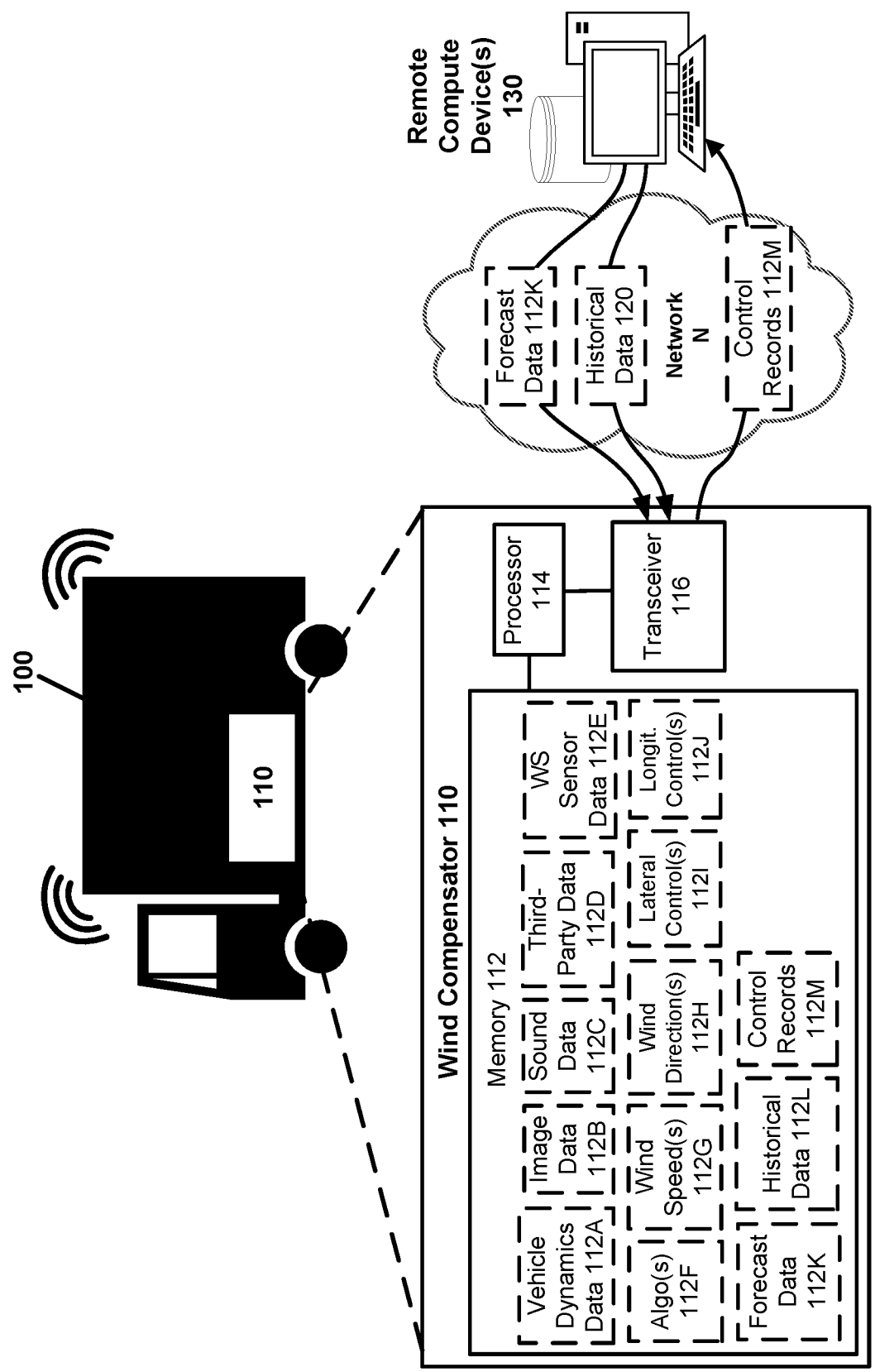
FIG. 1 is a diagram of a wind compensator system of an autonomous vehicle, according to some embodiments.

Semi-trucks are susceptible to wind interference because of their large size. For example, semi-trucks include enormous surfaces that can act as "sail areas" (i.e., surfaces that generate thrust when positioned in the path of wind), which can catch the wind, similar to a sail on a sailboat. A side of a semi-trailer can have an area of, for example, —500 square feet. The greater the surface area of the sail area, the more powerful the impact of wind pressure, and the wind pressure, in turn, can then cause the semi-truck and especially the trailer to move—just like a sail. This can leads to a semi-truck losing control and causing a wreck as a result of driving in windy conditions. In addition, headwinds and crosswinds reduce semi-truck fuel economy, especially at highway speeds, by increasing aerodynamic drag. Headwinds and tailwinds are parallel to the vehicle direction, and thus affect longitudinal control and change the fuel consumption rate. Crosswinds can cause vehicles to deviate from lane center. Moreover, driving directly into the wind can be detrimental to the serviceability of a semi-truck, for example due to increased engine wear and tire wear. Known vehicle control systems do not have systematic and reliable ways of estimating wind speed and direction in real-time, much less the ability to use such information to improve longitudinal and lateral performance of vehicles.

Systems and methods of the present disclosure, according to some embodiments, address the foregoing challenges by facilitating wind compensation during the operation of autonomous vehicles. For example, in some embodiments, wind disturbance information is estimated in real-time based on (1) data generated by one or more sensors onboard an autonomous vehicle, and (2) queried wind information (e.g., received from one or more local weather stations). The estimated wind disturbance information can include estimated wind speed and estimated wind direction. In response to generating the estimated wind disturbance information, and based on the estimated wind disturbance information, adaptive changes to one or more control systems of the autonomous vehicle can be applied (e.g., autonomously). For example, a route plan of the autonomous vehicle can be modified and/or operational settings of the autonomous vehicle can be modified, based on the estimated wind disturbance information, to maintain a desired motion (e.g., longitudinal motion and/or lateral motion) of the autonomous vehicle during a trip of the autonomous vehicle, and/or to improve a fuel efficiency of the autonomous vehicle.

In some embodiments, a wind disturbance estimation and compensation method includes a data fusion process in which various data inputs—e.g., vehicle dynamics data, image-based data, sound-based data, data from wind speed sensors, and/or data from queries of third-party data (e.g., queries of local weather stations via public application programming interfaces (APIs))—are used to generate a wind estimation algorithm to estimate wind speed and wind direction. In some implementations, "data fusion" includes a cascaded decision-making process, in which relevant data is identified and only relevant data is taken into account. The data inputs can be generated or received at the autonomous vehicle by/for one or more of: a vehicle controller area network (CAN), cameras, microphones, wind speed sensors, position sensors, inertial sensors (e.g., detecting heading and/or attitude), or other sensors. One or more of the foregoing sensors can be onboard the autonomous vehicle. Once the wind speed and wind direction have been estimated using the wind estimation algorithm, and based on the estimated wind speed and wind direction, one or more longitudinal control parameters can be adaptively changed (e.g., by increasing a feedforward propulsion force, or "forward propulsion force," of the autonomous vehicle to compensate for strong headwind). Longitudinal control can refer to the control of speed, rate of acceleration, and/or rate of deceleration of the autonomous vehicle. Alternatively or in addition, based on the estimated wind speed and wind direction, one or more lateral control parameters can be adaptively tuned (e.g., by increasing a steering offset of the autonomous vehicle to compensate for a crosswind). Alternatively or in addition, based on the estimated wind speed and wind direction, a planned target vehicle speed can be adaptively tuned, for example to improve a fuel efficiency of the autonomous vehicle (e.g., by lowering a nominal target speed if the headwind is over a certain threshold). Alternatively or in addition, based on the estimated wind speed and wind direction, a route selection modification (e.g., a detour) can be performed (e.g., if a strong headwind/crosswind is detected along the original route but not along an alternative route). Alternatively or in addition, based on the estimated wind speed and wind direction, an automatic adjustment of one or more aerodynamic drag reduction devices can be performed on the autonomous vehicle. Alternatively or in addition, based on the estimated wind speed and wind direction, an automatic adjustment to an angle of one or more windows, mirrors, or other articulable surfaces of the autonomous vehicle can be performed. Any of the foregoing can be performed automatically, in real-time or substantially in real-time relative to the estimation of the wind speed and the wind direction. In addition, the foregoing adaptations can be performed iteratively over time, in response to multiple sequential estimations of wind speed and wind direction, and can be triggered, in turn, by those sequential estimations of wind speed and wind direction. In some implementations, each estimation of wind speed and wind direction can be initiated or triggered based on one or more of: a predefined schedule, one or more weather reports, one or more sensor data generated at the autonomous vehicle, detecting that one or more sensor data generated at the autonomous vehicle exceeds a predefined threshold, etc.

In some embodiments, a wind disturbance estimation and compensation method factors in the presence of one or more fixed structures and/or a terrain on or near which an autonomous vehicle is travelling, for example by selecting sensor data, for estimation purposes, having a timestamp that does not coincide with a temporary blocking of wind by the one or more fixed structures and/or the terrain.

As used herein, a "semi-truck" refers to the combination of a tractor (also referred to as a tractor cab or rig) and one or more semi-trailers (e.g., for carrying freight). The tractor may be coupled to the one or more semi-trailers via one or more hitch connections, which provide mechanical, pneumatic and/or electrical coupling between the tractor and the one or more semi-trailers.

As used herein, an "autonomous vehicle" refers to any vehicle (e.g., a ground vehicle such as a car, truck, semi-truck, etc.) having vehicular automation, in that the vehicle is capable of sensing its environment and safely travelling (e.g., along a road) without human input, or with minimal human input. Autonomous vehicles described herein can be configured to wirelessly communicate with one or more remote compute devices, during periods of time when wireless connectivity is available/possible, for a variety of purposes including, but not limited to: receiving third-party data such as weather reports and alerts, receiving global positing system (GPS) data, receiving navigation commands, receiving or transmitting map data, receiving remote sensor data (i.e., data from sensors not disposed within or on the autonomous vehicle, but pertinent to the operations of the autonomous vehicle, such as sensors to detect road moisture, wind and temperature data associated with one or more locations along a route of travel, earthquake detection instruments (e.g., seismometers), etc.), transmitting sensor data generated at the autonomous vehicle, transmitting alerts, etc.

FIG. 1 is a diagram of a wind compensator system of an autonomous vehicle, according to some embodiments. As shown in FIG. 1, the wind compensator 110 can reside in or on an autonomous vehicle 100, and includes a processor 114 operably coupled to a memory 112 and a transceiver 116. The memory 112 stores one or more of: vehicle dynamics data 112A, image data 112B, sound data 112C, third-party data 112D, wind speed sensor data 112E, one or more algorithms 112F, wind speed(s) 112G, wind directions(s)

112H, lateral control(s) 112I (e.g., steering commands, steering settings, steering wheel positions or trajectories, control signals associated with steering, path of travel, etc.), longitudinal control(s) 112J (e.g., one or more speed settings, acceleration settings, acceleration plans, deceleration settings, deceleration plans, braking plans, brake settings, control signals associated with braking, etc.), forecast data 112K, historical data 112L (which may include historical data 120, discussed below), or control records 112M. Each of the vehicle dynamics data 112A, image data 112B, sound data 112C, and wind speed sensor data 112E can be generated by sensors onboard the autonomous vehicle 100. In addition, historical data 120 (e.g., historical wind data) and/or the forecast data 112K (e.g., weather forecasts) pertinent to the estimation of wind speed and/or to the estimation of wind direction can be received at the wind compensator 110, at the transceiver 116 and via a wireless telecommunications network "N," from one or more remote compute device(s) 130 (e.g., one or more centralized compute devices in communication with a fleet of autonomous vehicles, and/or one or more compute devices of third parties). In addition, control records 112M can be generated by the wind compensator 110 and transmitted via the transceiver 116 to one or more remote compute devices 130 via the network N. The control records 112M can specify, for example, the estimated wind speed(s) and/or wind direction(s), any compensating actions taken with respect to the operation of the autonomous vehicle (e.g., lateral controls 112I and/or longitudinal controls 112J) in response to the estimated wind speed(s) and/or wind direction(s), date, time, location information, and/or a semi-truck identifier.

In some implementations, the wind compensator 110 is connected, at the autonomous vehicle 100, to one or more controllers (e.g., electronic control units (ECUs)) that can receive data (such as lateral control(s) 112I and/or longitudinal control(s) 112J) from the wind compensator and cause them to be implemented at the autonomous vehicle (e.g., to change speed, change direction, change lane, modify trip, etc.). Additional description of vehicle control methods compatible with the present disclosure can be found, by way of example, in U.S. Patent Application Publication No. 2019/0187705, published Jun. 20, 2019 and titled "Method and System for Personalized Self Capability Aware Route Planning in Autonomous Driving Vehicles," the entire content of which is incorporated by reference herein in its entirety.

In some implementations, the one or more remote compute device(s) 130 includes at least one centralized compute device in communication with a fleet of autonomous vehicles. The one or more remote compute device(s) 130 can receive any of the lateral control(s) 112I, longitudinal control(s) 112J, wind speed(s) 112G, wind direction(s) 112H, wind speed sensor data 112E, forecast data 112K, and control records 112M from the autonomous vehicle 100 (via the transceiver 116 of the wind compensator and the network N) and communicate the data or a subset thereof to one or more other autonomous vehicles within the fleet of autonomous vehicles. Alternatively or in addition, the one or more remote compute device(s) 130 can generate one or more commands or modified datasets (e.g., lateral controls, modified lateral controls, longitudinal controls, modified longitudinal controls, routes of travel, modified routes of travel, modified travel plans, travel restrictions, etc.), based on any of the lateral control(s) 112I, longitudinal control(s) 112J, wind speed(s) 112G, wind direction(s) 112H, wind sensor data 112E, forecast data 112K, and control records 112M, and cause transmission of the one or more commands or modified datasets to the one or more other autonomous vehicles within the fleet of autonomous vehicles.

The forecast data 112K can be used, for example, as an input to the estimation of a wind speed and/or to the estimation of a wind direction. Alternatively or in addition, the forecast data 112K can be used to verify or modify one or more previously estimated wind speeds and/or wind directions. Moreover, in some implementations, the forecast data 112K can be used to generate (e.g., at the autonomous vehicle 100 and/or at a remote compute device 130) an alternative route for the autonomous vehicle 100 to take, while on a trip, to avoid dangerous winds or other inclement weather.

The vehicle dynamics data 112A can include, by way of non-limiting example, one or more of: linear speed, velocity, engine torque, engine horsepower, engine displacement volume, weight (e.g., tractor and/or trailer weight), cargo type and attachment method, vehicle surface area, vehicle dimensions, wheel turn angle, turn radius, wheel velocity (e.g., rotational equivalent wheel velocity or wheel ground contact point velocity), longitudinal slip, side (lateral) slip, tire side-slip angle.

Components of the system of FIG. 1 (or portions thereof) can be configured to function within various types of network environments that can include one or more devices and/or one or more server devices. For example, as used herein, a wireless telecommunications network (e.g., the wireless telecommunications network N of FIG. 1) can be, or can include, a local area network (LAN), a wide area network (WAN), and/or so forth. The network can be, or can include, a wireless network and/or wireless network implemented using, for example, gateway devices, bridges, switches, and/or so forth. The network can include one or more segments and/or can have portions based on various protocols such as Internet Protocol (IP) and/or a proprietary protocol. The network can include at least a portion of the Internet.

Figure 2:
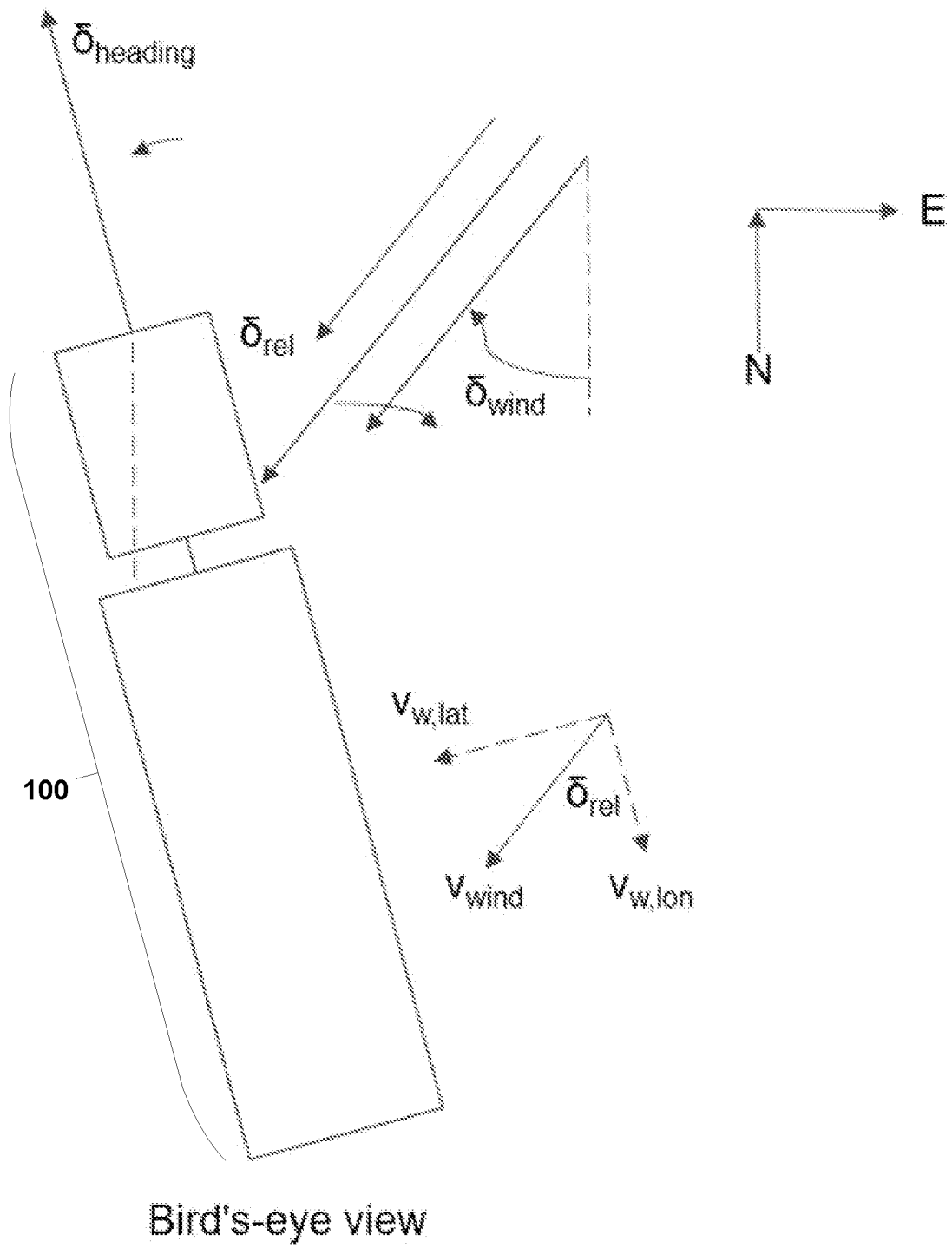
FIG. 2 is a diagram showing directions and angles relevant to the calculation of estimated wind speed and wind angle, according to some embodiments.

FIG. 2 is a diagram showing directions and angles relevant to the calculation of estimated wind speed and wind angle, according to some embodiments. As shown in FIG. 2, the autonomous vehicle 100 includes a cab and a trailer. A wind direction angle is denoted by $\delta_{wind}$, has a value of 0 for southward travel, and increases in value along a clockwise direction. A vehicle heading angle is denoted by $\delta_{heading}$, has a value of 0 for northward travel, and increases in value along a counterclockwise direction. A wind relative angle is denoted as $\delta_{rel}$, and is defined as: $\delta_{rel}=\delta_{wind}+\delta_{heading}$, with a value of 0 representing a vehicle direction, and the value increasing along a clockwise direction. Wind speed is denoted by $v_{wind}$. A lateral wind speed is denoted as $v_{w,lat}$, is defined as $v_{w,lat}=v_{wind}*\sin(\delta_{rel})$, and has a positive value when its direction is towards vehicle left. A longitudinal wind speed is denoted as $v_{w,lon}$, is defined as $v_{w,lon}=v_{wind}*\cos(\delta_{rel})$, and has a positive value when its direction is towards a rear of the vehicle. In some implementations, one or both of the wind direction angle ($\delta_{wind}$) and the wind speed ($v_{wind}$) is estimated in real-time or substantially in real-time. By way of example, with reference to FIG. 1, one or both of the wind direction angle and the wind speed can be estimated (in real-time or substantially in real-time) using one or more algorithms 112F of a wind compensator 110, and the estimated values can be stored as wind direction(s) 112H and wind speed(s) 112G, respectively.

Alternatively or in addition to the foregoing, in some implementations, although referred to herein as "wind speed," the wind speed term $v_{wind}$ has a direction associated with it, and thus is a velocity. Alternatively or in addition, in some implementations, only wind components that are parallel to the earth's plane, or that are substantially parallel to the earth's plane, are considered during the estimation of the wind direction angle ($\delta_{wind}$) and/or of the wind speed ($v_{wind}$).

Figure 3:
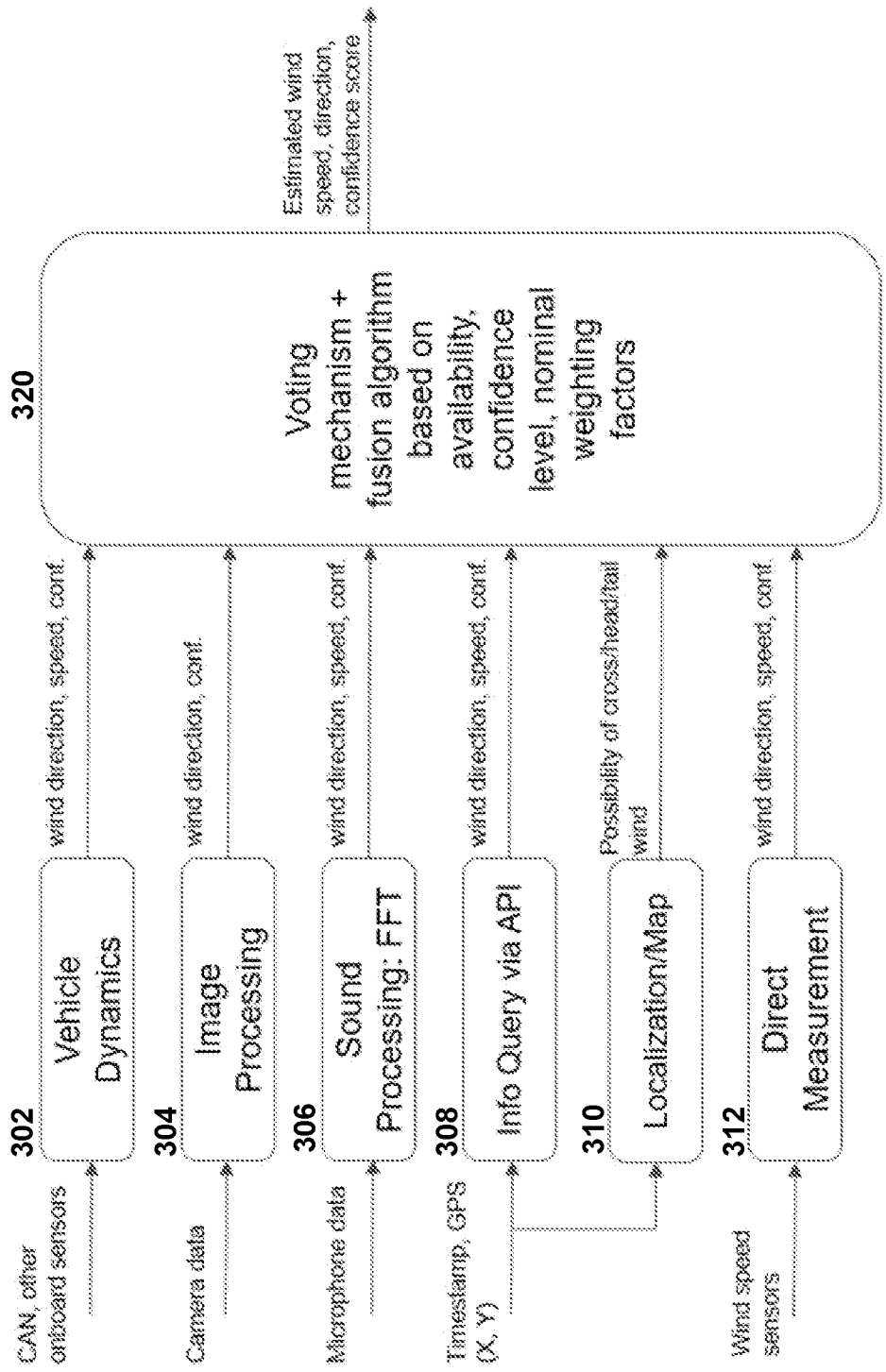
FIG. 3 is a flow diagram showing a process for generating estimated wind speed, estimated wind direction, and associated confidence score(s), according to some embodiments.

FIG. 3 is a flow diagram showing a process for generating estimated wind speed, estimated wind direction, and associated confidence score(s), according to some embodiments. As shown in FIG. 3, there are several inputs to the process, including vehicle dynamics data 302, image processing data 304, sound processing data 306, data associated with an information query made via an API 308, localization/map data 310, and direct wind measurement data 312. At least a portion of the vehicle dynamics data 302 can be generated, for example using a CAN and/or other sensors onboard the autonomous vehicle, and can include one or more of: longitudinal vehicle dynamics (e.g., including estimated powertrain parameters, estimated rolling friction, estimated dynamic friction, estimated aerodynamic drag, etc.), lateral vehicle dynamics, vehicle speed, vehicle acceleration, powertrain signals (throttle and/or engine torque), or self-aligning torque (SAT). At least a portion of the image processing data 304 can be generated, for example using one or more cameras onboard the autonomous vehicle, and can include one or more of: event based data, data indicating the detection of objects (e.g., trees, flags) and/or of movement of objects, detection of trailer swing, images of the autonomous vehicle, or images of other vehicles. At least a portion of the sound processing (audio) data 306 can be generated, for example using one or more microphones onboard the autonomous vehicle (e.g., on both sides of the autonomous vehicle, on one side of the autonomous vehicle, inside of the autonomous vehicle, outside of the autonomous vehicle, or inside and outside of the autonomous vehicle), and optionally by applying a signal transformation (e.g., a Fast Fourier Transform (FFT)) to raw sound data such that a magnitude of the transformed signal can be used to indicate wind direction and/or speed. The information query data 308 received via an API may be received via a wireless network (such as a cellular network), and the API can be a public wind API providing access to publicly-available wind data collected from other sensors. The localization/map data 310 can include annotated location information that can be applied as a filter to discount false indications/estimations of wind (e.g., due to faulty sensors). For example, there should not be crosswind in a long tunnel, and strong wind should not be detected as coming from a side of the autonomous vehicle when that side of the autonomous vehicle is adjacent to or facing a wall or mountain. At least a portion of the direct wind measurement data 312 can be generated, for example using one or more wind speed sensors onboard the autonomous vehicle. Other sensors that can provide direct wind measurement data 312 can include accelerometers, gyproscopes, magnetometers, etc., e.g., to detect wind velocity, yaw, pitch, roll, etc.

Any or all of the vehicle dynamics data 302, the sound processing data 306, the data associated with the information query made via the API 308, and the direct wind measurement data 312 can be used as part of an estimation of wind direction, an estimation of wind speed, and a calculation of one or more confidence scores. The image processing data 304 can be used as part of the estimation of wind direction and the calculation of the confidence score(s). The localization/map data 310 can be used to assess a probability of a detected cross-wind, a detected head-wind, and/or a detected tail-wind being accurately detected/possible. At 320, a voting mechanism and/or fusion algorithm is performed (executed) based on the various inputs 302 through 312 according to their availability, their associated confidence level, and optionally based on one or more nominal weighting factors. The algorithm(s) output an estimated wind speed, an estimated wind speed, and a confidence score (either for each of the estimated wind speed and the estimated wind speed, or for both as a combination). Optionally, one or more of the various inputs 302 through 312 has an associated confidence level from a set of confidence levels that are used in the calculation of the output confidence score(s).

As an example of a voting mechanism that may be performed at 320, suppose that five different estimates of wind speed are obtained (e.g., from vehicle dynamics 302, image processing 304, sound processing 306, information query 308, and direct measurement 312, or from a sub-combination thereof). Three of the five estimates are "10-12 mph," one of the estimates is "8-10 mph," and another of the estimates is "6-8 mph." In response to the statistical prevalence of the estimate "10-12 mph," an estimate of "10-12 mph" is selected. In other words, the estimate "10-12 mph" has the greatest number of votes.

If a fusion algorithm is performed at 320, the output of the fusion algorithm can be, for example, a summed product of estimates (e.g., the five different estimates discussed above) and their real-time weighting factors. Suppose that the nominal weighting factors are 0.2 at runtime for all five sub-algorithms (i.e., W1=0.2, W2=0.2, W3=0.2, W4=0.2, and W5=0.2, summing to 1). The output estimate would thus be calculated as W1*E1+W2*E2+W3*E3+W4*E4+W5*E5, with each "E" value being one of the estimates (e.g., an estimation output of an individual sub-algorithm). As noted above, a confidence level may be set in each sub-algorithm or for each source, for example based on one or more of data availability, data quality, data frequency, etc. The nominal weighting factors W1 through W5 are initial parameters in the fusion algorithm, representing relative importances of the sub-algorithms in the final outputs, if there is no real-time adjustment of these factors by an associated confidence level.

In some implementations, one or more longitudinal motion signals (e.g., vehicle speed, acceleration) from the vehicle dynamics data 302 are mapped to one or more powertrain signals (e.g., throttle and/or engine torque) from the vehicle dynamics data 302 to estimate a wind force and, in turn an associated head wind or tail wind speed. Alternatively or in addition, a detected additional amount of steering torque used to maintain the autonomous vehicle on a straight line path of travel (e.g., a difference or discrepancy between an actual self-aligning torque (SAT) and an expected SAT) can be used to indicate a wind direction.

In some implementations, a strength of the sound processing (audio) data 306 (e.g., a strength of the processed wind sound coming from left and right microphones) can be used to estimate wind speed and/or wind direction.

Figure 4:
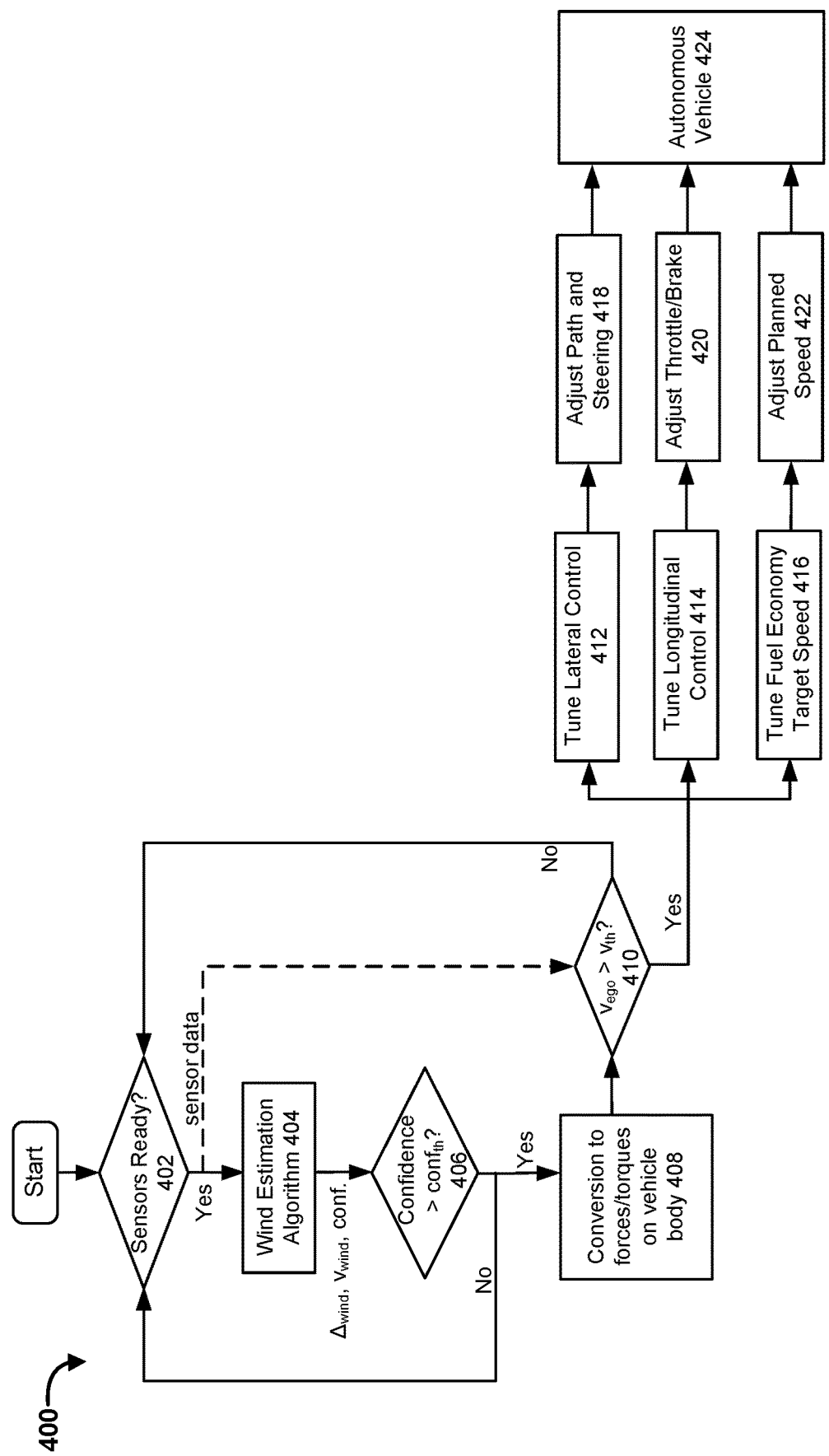
FIG. 4 is a flow diagram showing an example method for performing wind estimation and wind compensation control of an autonomous vehicle, according to some embodiments.

FIG. 4 is a flow diagram showing an example method for performing wind estimation and wind compensation control of an autonomous vehicle, according to some embodiments. As shown in FIG. 4, the method 400 includes performing a sensor check at 402 to determine whether all relevant sensors of the autonomous vehicle 424 (or a sufficient subset there) are ready/operational/calibrated. If the sensors are "ready" at 402, a wind estimation algorithm 404 is performed (e.g., including one or more equations shown and described with reference to FIG. 2, and/or as discussed in reference to the various sensor data of FIG. 3), to generate a wind direction ("$\Delta_{wind}$"), a wind speed, and a confidence level. At 406, a determination is made as to whether the calculated confidence level is greater than a threshold confidence value. If the calculated confidence level is not greater than a threshold confidence value at 406, the method 400 may loop back to sensor check at 402 to prompt a new subsequent calculation of a change in a representation of the wind direction, a wind speed, and a confidence level. If it is determined at 406 that the calculated confidence level is greater than a threshold confidence value, a conversion of the wind direction and/or the wind speed values into forces/torques on the body of the autonomous vehicle 424 is performed. At 410, a determination is made as to whether a velocity of the autonomous vehicle ("ego vehicle" velocity $v_{ego}$) is greater than a threshold wind speed $v_{th}$. As shown by the dashed arrow in FIG. 4, in some implementations, raw sensor data may also be taken into account as part of the velocity check at 410. The velocity check at 410 can be performed, for example, because the impact of wind on safety is greater at higher ego vehicle velocities. If $v_{ego}$ is not $>v_{th}$, the method 400 may loop back to sensor check at 402 to prompt a new subsequent calculation of the wind direction, a wind speed, and a confidence level. If $v_{ego}>v_{th}$, the method 400 proceeds to automatically implement one or more various adjustments to the operation of the autonomous vehicle 424, as applicable for given wind situation. These adjustments include, for example, tuning/changing one or more lateral controls at 412, tuning/changing one or more longitudinal controls at 414, and tuning a target speed for fuel economy at 416. The tuning/changing the one or more lateral controls at 412 can include, at 418, adjusting a current or planned path of travel of the autonomous vehicle 424 and/or adjusting a steering setting or plan of the autonomous vehicle 424. The tuning one or more longitudinal controls at 414 can include, at 420, adjusting a throttle setting or plan of the autonomous vehicle 424 and/or adjusting a brake setting or plan of the autonomous vehicle 424. The tuning the target speed for fuel economy at 416 can include, at 422, adjusting a planned speed of the autonomous vehicle 424. Each of the adjustments 418 through 422 can be implemented by generating and sending one or more control signals to the autonomous vehicle.

Figure 5:
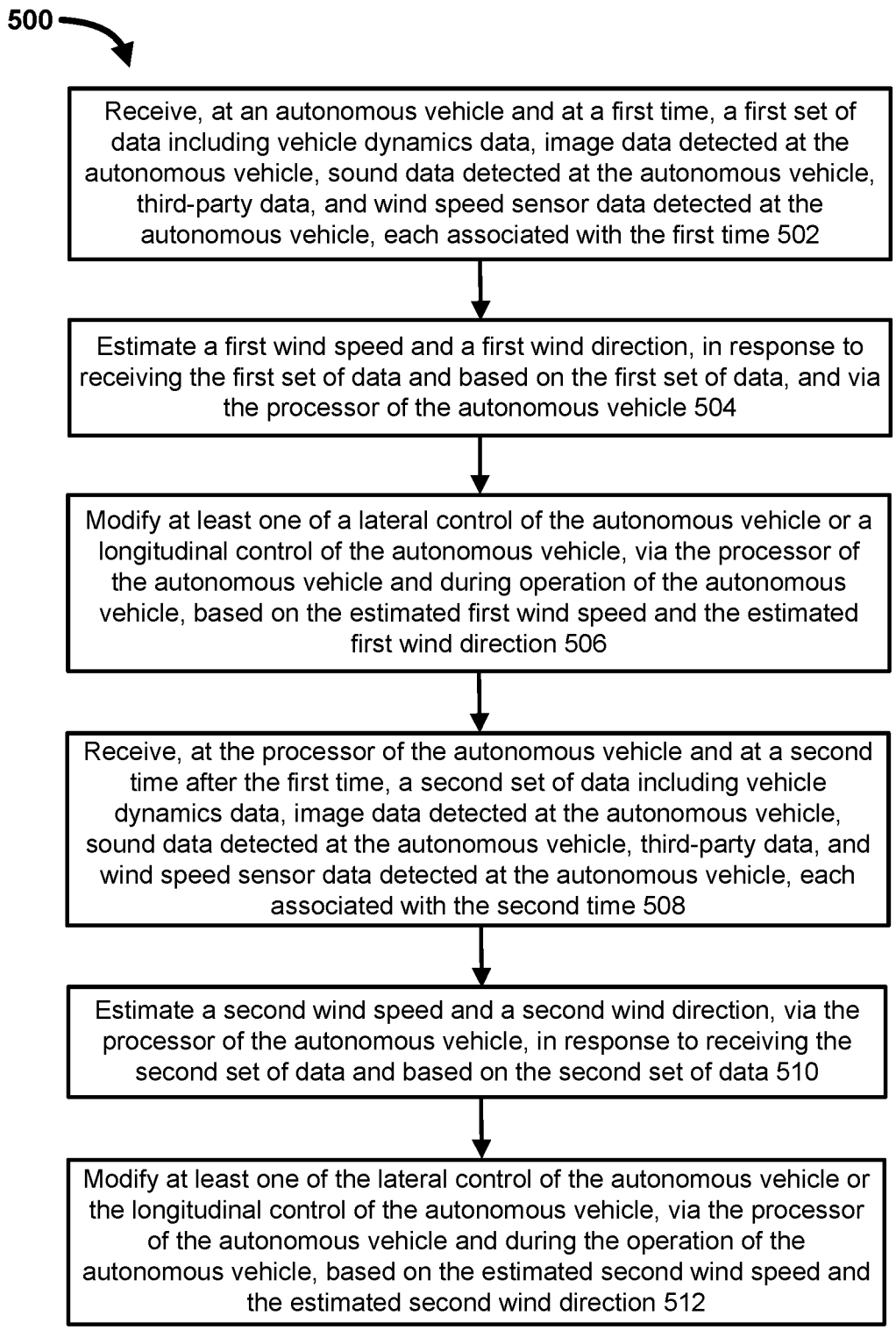
FIG. 5 is a flow diagram showing a first example method for performing dynamic wind estimation and control modification for an autonomous vehicle, according to some embodiments.

FIG. 5 is a flow diagram showing a first example method for performing dynamic wind estimation and control modification for an autonomous vehicle, according to some embodiments. The method 500 of FIG. 5 can be performed, for example, by the wind compensator 110 of FIG. 1, and/or using the process shown in FIG. 3. As shown in FIG. 5, the method 500 includes receiving, at 502, at a processor of an autonomous vehicle (e.g., processor 114 of FIG. 1) and at a first time, a first set of data including vehicle dynamics data (e.g., vehicle dynamics data 112A of FIG. 1), image data detected at the autonomous vehicle (e.g., image data 112B of FIG. 1), sound data detected at the autonomous vehicle (e.g., sound data 112C of FIG. 1), third-party data (e.g., third-party data 112D of FIG. 1), and wind speed sensor data detected at the autonomous vehicle (e.g., WS sensor data 112E of FIG. 1), each associated with the first time. The method 500 also includes estimating, at 504, in response to receiving the first set of data and based on the first set of data, and via the processor of the autonomous vehicle (e.g., using one or more of the algorithms 112F of FIG. 1), a first wind speed and a first wind direction. The first wind speed and the first wind direction can be stored in a memory (e.g., memory 112 in FIG. 1). The method 500 also includes modifying, at 506, via the processor of the autonomous vehicle and during operation of the autonomous vehicle, at least one of a lateral control of the autonomous vehicle (e.g., lateral control(s) 112I of FIG. 1) or a longitudinal control of the autonomous vehicle (e.g., longitudinal control(s) 112I of FIG. 1) based on the estimated first wind speed and the estimated first wind direction. The method 500 also includes receiving, at 508, at the processor of the autonomous vehicle and at a second time after the first time, a second set of data including vehicle dynamics data, image data detected at the autonomous vehicle, sound data detected at the autonomous vehicle, third-party data, and wind speed sensor data detected at the autonomous vehicle, each associated with the second time. The method 500 also includes estimating, at 510, in response to receiving the second set of data and based on the second set of data, and via the processor of the autonomous vehicle, a second wind speed and a second wind direction. The method 500 also includes modifying, at 512, via the processor of the autonomous vehicle and during the operation of the autonomous vehicle, at least one of the lateral control of the autonomous vehicle or the longitudinal control of the autonomous vehicle based on the estimated second wind speed and the estimated second wind direction.

In some implementations, at least one of (1) the estimating the first wind speed and the first wind direction or (2) the estimating the second wind speed and the second wind direction, is performed using a sensor fusion algorithm.

In some implementations, at least one of the third-party data of the first set of data or the third-party data of the second set of data includes at least one of query data received via an application programming interface (API) or Global Positioning System (GPS) data.

In some implementations, at least one of (1) the modifying based on the estimated first wind speed and the estimated first wind direction or (2) the modifying based on the estimated second wind speed and the estimated second wind direction, includes modifying of the longitudinal control of the autonomous vehicle, and the longitudinal control of the autonomous vehicle is one of a forward propulsion force or an engine throttle.

In some implementations, at least one of (1) the modifying based on the estimated first wind speed and the estimated first wind direction or (2) the modifying based on the estimated second wind speed and the estimated second wind direction, includes modifying of the lateral control of the autonomous vehicle, and the lateral control of the autonomous vehicle is a steering offset.

In some implementations, at least one of (1) the modifying based on the estimated first wind speed and the estimated first wind direction or (2) the modifying based on the estimated second wind speed and the estimated second wind direction, includes modifying of the speed of the autonomous vehicle, and the speed of the autonomous vehicle is one of a current speed of the autonomous vehicle or a planned speed of the autonomous vehicle.

In some implementations, the method also includes selecting a travel route for the autonomous vehicle based on (1) the first wind speed and the first wind direction or (2) the second wind speed and the second wind direction.

In some implementations, the longitudinal control of the autonomous vehicle includes one of a target speed, a target acceleration, or a target deceleration.

Figure 6:
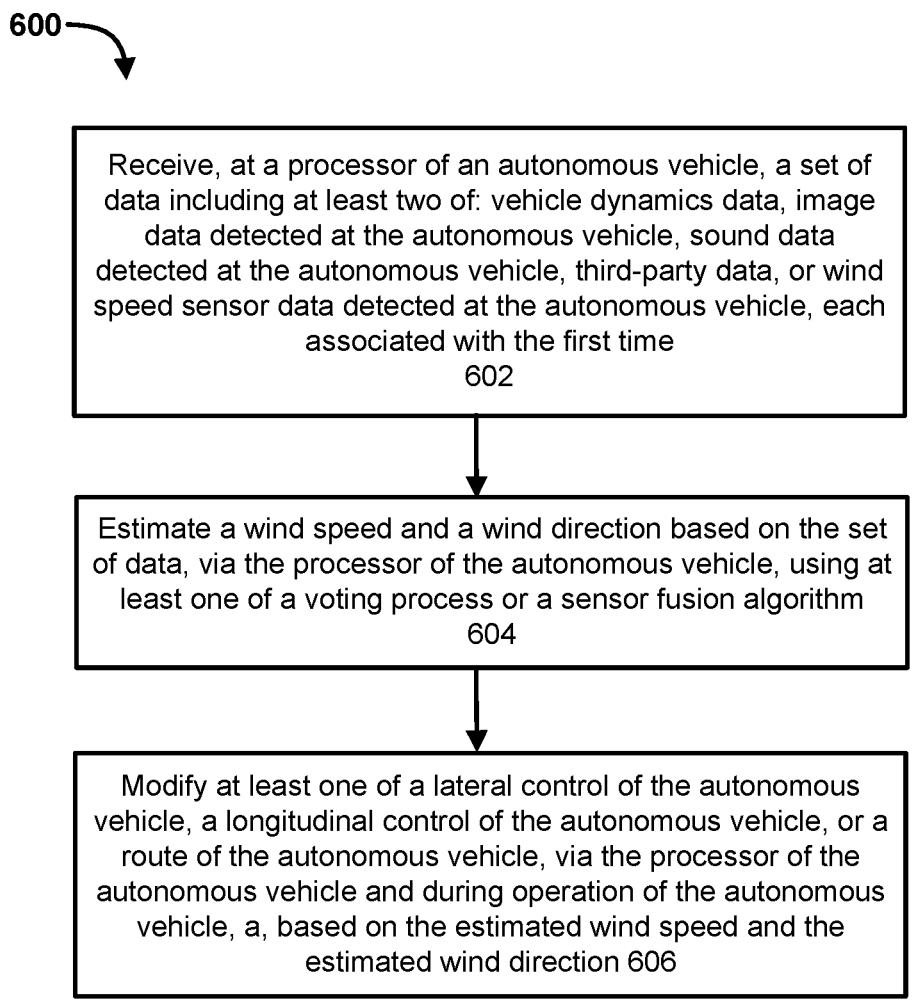
FIG. 6 is a flow diagram showing a second example method for performing wind estimation and control modification for an autonomous vehicle, according to some embodiments.

FIG. 6 is a flow diagram showing a second example method for performing wind estimation and control modification for an autonomous vehicle, according to some embodiments. The method 600 of FIG. 6 can be performed, for example, by the wind compensator 110 of FIG. 1, and/or using the process shown in FIG. 3. As shown in FIG. 6, the method 600 includes receiving, at 602 and at a processor of an autonomous vehicle, a set of data including at least two of: vehicle dynamics data (e.g., vehicle dynamics data 112A of FIG. 1), image data detected at the autonomous vehicle (e.g., image data 112B of FIG. 1), sound data detected at the autonomous vehicle (e.g., sound data 112C of FIG. 1), third-party data (e.g., third-party data 112D of FIG. 1), or wind speed sensor data detected at the autonomous vehicle (e.g., WS sensor data 112E of FIG. 1), each associated with the first time. The method 600 also includes estimating, at 604 and via the processor of the autonomous vehicle (e.g., using one or more of the algorithms 112F of FIG. 1), a wind speed and a wind direction based on the set of data, using at least one of a voting process or a sensor fusion algorithm. The wind speed and the wind direction can be stored in a memory (e.g., memory 112 in FIG. 1). The method 600 also includes modifying, at 606 and via the processor of the autonomous vehicle and during operation of the autonomous vehicle, at least one of a lateral control of the autonomous vehicle (e.g., lateral control(s) 112I of FIG. 1), a longitudinal control of the autonomous vehicle (e.g., longitudinal control(s) 112I of FIG. 1), or a route of the autonomous vehicle, based on the estimated wind speed and the estimated wind direction.

In some implementations, the vehicle dynamics data includes at least one of a powertrain inverse model, a pitch of a road on which the autonomous vehicle is driving, or a self-aligning torque.

In some implementations, the vehicle dynamics data includes Controller Area Network (CAN) data detected at the autonomous vehicle.

In some implementations, the sound data is sound data detected by at least one microphone onboard the autonomous vehicle.

In some implementations, the third-party data includes query results obtained via a cellular network.

In some implementations, the image data includes a depiction of at least one of a stationary object within an environment of the autonomous vehicle or a position of a portion of the autonomous vehicle.

In some implementations, the longitudinal control of the autonomous vehicle includes a target speed.

In some implementations, the set of data includes the vehicle dynamics data and the third-party data.

In some implementations, the set of data includes only the vehicle dynamics data and the third-party data.

In some implementations, the set of data includes the vehicle dynamics data and wind speed sensor data.

In some implementations, the set of data includes only the vehicle dynamics data and the wind speed sensor data.

Figure 7:
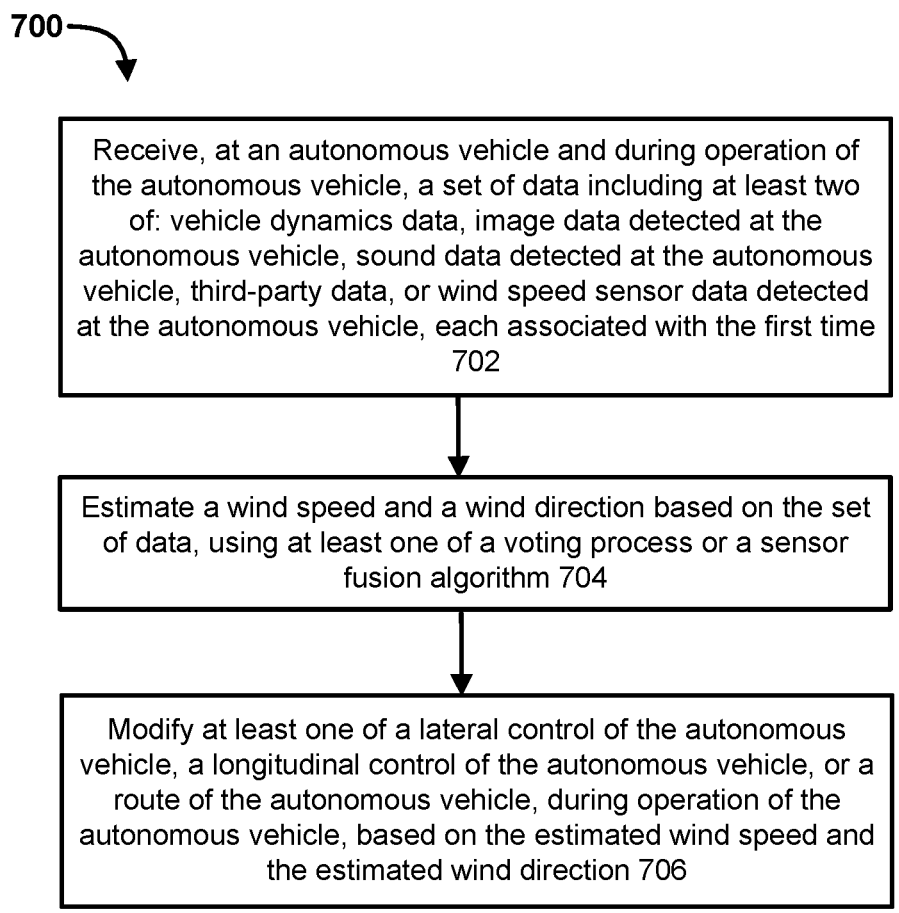
FIG. 7 is a flow diagram showing a third example method for performing wind estimation and control modification for an autonomous vehicle, according to some embodiments.

In some embodiments, a non-transitory, processor-readable medium stores processor-executable instructions to cause a processor to perform a method, such as the method shown in FIG. 7. As shown in FIG. 7, the method 700 includes receiving, at 702, at an autonomous vehicle and during operation of the autonomous vehicle, a set of data. The set of data includes at least two of: vehicle dynamics data, image data detected at the autonomous vehicle, sound data detected at the autonomous vehicle, third-party data, or wind speed sensor data detected at the autonomous vehicle, each associated with the first time. The method 700 also includes estimating, at 704, a wind speed and a wind direction based on the set of data, using at least one of a voting process or a sensor fusion algorithm. The method 700 also includes modifying, at 706 and during operation of the autonomous vehicle, at least one of a lateral control of the autonomous vehicle, a longitudinal control of the autonomous vehicle, or a route of the autonomous vehicle, based on the estimated wind speed and the estimated wind direction.

In some implementations, the non-transitory, processor-readable medium also stores instructions to cause the processor to adaptively tune at least one of the lateral control of the autonomous vehicle, the longitudinal control of the autonomous vehicle, the speed of the autonomous vehicle, or the route of the autonomous vehicle, in response to at least one additional set of data including at least two of: vehicle dynamics data, image data detected at the autonomous vehicle, sound data detected at the autonomous vehicle, third-party data, or wind speed sensor data detected at the autonomous vehicle.

In some implementations, the non-transitory, processor-readable medium also stores instructions to cause the processor to automatically adjust an articulable surface of the autonomous vehicle based on the estimated wind speed and the estimated wind direction.

In some implementations, the articulable surface is a mirror.

In some implementations, the instructions to modify based on the estimated wind speed and the estimated wind direction include instructions to modify the longitudinal control of the autonomous vehicle, and the longitudinal control of the autonomous vehicle is one of a forward propulsion force or an engine throttle.

In some implementations, the instructions to modify based on the estimated wind speed and the estimated wind direction include instructions to modify the lateral control of the autonomous vehicle, and the lateral control of the autonomous vehicle is a steering offset.

In some implementations, the non-transitory, processor-readable medium stores instructions to cause the processor to select a travel route for the autonomous vehicle based on the estimated wind speed and the estimated wind direction.

In some implementations, the non-transitory, processor-readable medium also stores instructions to cause the processor to automatically adjust an aerodynamic drag reduction device on the autonomous vehicle based on the estimated wind speed and the estimated wind direction.

In some implementations, the longitudinal control of the autonomous vehicle includes a target speed.

All combinations of the foregoing concepts and additional concepts discussed herewithin (provided such concepts are not mutually inconsistent) are contemplated as being part of the subject matter disclosed herein. The terminology explicitly employed herein that also may appear in any disclosure incorporated by reference should be accorded a meaning most consistent with the particular concepts disclosed herein.

The drawings are primarily for illustrative purposes, and are not intended to limit the scope of the subject matter described herein. The drawings are not necessarily to scale; in some instances, various aspects of the subject matter disclosed herein may be shown exaggerated or enlarged in the drawings to facilitate an understanding of different features. In the drawings, like reference characters generally refer to like features (e.g., functionally similar and/or structurally similar elements).

The entirety of this application (including the Cover Page, Title, Headings, Background, Summary, Brief Description of the Drawings, Detailed Description, Embodiments, Abstract, Figures, Appendices, and otherwise) shows, by way of illustration, various embodiments in which the embodiments may be practiced. The advantages and features of the application are of a representative sample of embodiments only, and are not exhaustive and/or exclusive. Rather, they are presented to assist in understanding and teach the embodiments, and are not representative of all embodiments. As such, certain aspects of the disclosure have not been discussed herein. That alternate embodiments may not have been presented for a specific portion of the innovations or that further undescribed alternate embodiments may be available for a portion is not to be considered to exclude such alternate embodiments from the scope of the disclosure. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure.

Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure.

The term "automatically" is used herein to modify actions that occur without direct input or prompting by an external source such as a user. Automatically occurring actions can occur periodically, sporadically, in response to a detected event (e.g., a user logging in), or according to a predetermined schedule.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Some embodiments and/or methods described herein can be performed by software (executed on hardware), hardware, or a combination thereof. Hardware modules may include, for example, a general-purpose processor, a field programmable gate array (FPGA), and/or an application specific integrated circuit (ASIC). Software modules (executed on hardware) can be expressed in a variety of software languages (e.g., computer code), including C, C++, Java™, Ruby, Visual Basic™, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

Various concepts may be embodied as one or more methods, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments. Put differently, it is to be understood that such features may not necessarily be limited to a particular order of execution, but rather, any number of threads, processes, services, servers, and/or the like that may execute serially, asynchronously, concurrently, in parallel, simultaneously, synchronously, and/or the like in a manner consistent with the disclosure. As such, some of these features may be mutually contradictory, in that they cannot be simultaneously present in a single embodiment. Similarly, some features are applicable to one aspect of the innovations, and inapplicable to others.

In addition, the disclosure may include other innovations not presently described. Applicant reserves all rights in such innovations, including the right to embodiment such innovations, file additional applications, continuations, continuations-in-part, divisionals, and/or the like thereof. As such, it should be understood that advantages, embodiments, examples, functional, features, logical, operational, organizational, structural, topological, and/or other aspects of the disclosure are not to be considered limitations on the disclosure as defined by the embodiments or limitations or equivalents to the embodiments. Depending on the particular desires and/or characteristics of an individual and/or enterprise user, database configuration and/or relational model, data type, data transmission and/or network framework, syntax structure, and/or the like, various embodiments of the technology disclosed herein may be implemented in a manner that enables a great deal of flexibility and customization as described herein.

All definitions, as defined and used herein, should be understood to control over dictionary definitions, definitions in documents incorporated by reference, and/or ordinary meanings of the defined terms.

As used herein, in particular embodiments, the terms "about" or "approximately" when preceding a numerical value indicates the value plus or minus a range of 10%. Where a range of values is provided, it is understood that each intervening value, to the tenth of the unit of the lower limit unless the context clearly dictates otherwise, between the upper and lower limit of that range and any other stated or intervening value in that stated range is encompassed within the disclosure. That the upper and lower limits of these smaller ranges can independently be included in the smaller ranges is also encompassed within the disclosure, subject to any specifically excluded limit in the stated range. Where the stated range includes one or both of the limits, ranges excluding either or both of those included limits are also included in the disclosure.

As used herein, "substantially concurrently" can refer to events that take place at the same time when adjusted for processing-related delays (e.g., computation delay, transmission delay, etc.), or can refer to events that overlap in time.

As used herein, "substantially in real-time" can refer to an event that occurs immediately following a predicate event, adjusted for processing-related delays (e.g., computation delay, transmission delay, etc.).

The indefinite articles "a" and "an," as used herein in the specification and in the embodiments, unless clearly indicated to the contrary, should be understood to mean "at least one."

The phrase "and/or," as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the embodiments, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the embodiments, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the embodiments, shall have its ordinary meaning as used in the field of patent law.

As used herein in the specification and in the embodiments, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the embodiments, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A computer-implemented method comprising: receiving, by a computing system, a first set of data including wind speed sensor data captured at a vehicle and a first confidence level associated with the first set of data; prompting, by the computing system, a second set of data and a second confidence level associated with the second set of data based on a determination the confidence level fails to satisfy a confidence threshold; estimating, by the computing system, a wind speed and a wind direction based on the second set of data in response to a determination the second confidence level satisfies the confidence threshold; modifying, by the computing system, at least one of: a lateral control, a longitudinal control, or a route of the vehicle based on the estimated wind speed and the estimated wind direction; and adjusting, by the computing system, at least one of: a mirror, or an articulable surface of the vehicle based on the estimated wind speed and the estimated wind direction.

2. The computer-implemented method of claim 1, wherein the modifying the lateral control of the vehicle includes increasing or decreasing a steering offset of the vehicle.

3. The computer-implemented method of claim 1, wherein the modifying the longitudinal control of the vehicle includes increasing or decreasing at least one of: a forward propulsion force or an engine throttle of the vehicle.

4. The computer-implemented method of claim 1, wherein the modifying the route of the vehicle includes selecting an alternative route.

5. The computer-implemented method of claim 1, wherein the estimating the wind speed and the wind direction is in response to at least one of: a predetermined schedule, a weather report, or a determination that a sensor data captured at the vehicle exceeds a predetermined threshold.

6. The computer-implemented method of claim 1, wherein the estimating the wind speed and the wind direction is based on a voting process, wherein the voting process includes selection of a wind speed estimate from a set of wind speed estimates based on a number of votes associated with the wind speed estimate and selection of a wind direction estimate from a set of wind direction estimates based on a number of votes associated with the wind direction estimate.

7. The computer-implemented method of claim 1, wherein the estimating the wind speed and the wind direction is based on a fusion algorithm, wherein the fusion algorithm includes determination of a wind speed estimate based on a summation of a set of weighted wind speed estimates and determination of a wind direction estimate based on a summation of a set of weighted wind direction estimates.

8. The computer-implemented method of claim 1, wherein the estimating the wind speed and the wind direction includes estimating a lateral wind speed component and a longitudinal wind speed component based on the wind speed and estimating a lateral wind direction component and a longitudinal wind direction component based on the wind direction.

9. The computer-implemented method of claim 1, wherein the estimating the wind speed and the wind direction includes estimating a wind velocity parallel to an earth's plane.

10. A system comprising: a processor; and a memory operatively coupled to the processor, the memory storing instructions that when executed cause the processor to perform operations comprising: receiving a first set of data including wind speed sensor data captured at a vehicle and a first confidence level associated with the first set of data; prompting a second set of data and a second confidence level associated with the second set of data based on a determination the confidence level fails to satisfy a confidence threshold; estimating a wind speed and a wind direction based on the second set of data in response to a determination the second confidence level satisfies the confidence threshold; modifying at least one of: a lateral control, a longitudinal control, or a route of the vehicle based on the estimated wind speed and the estimated wind direction; and adjusting at least one of: a mirror, or an articulable surface of the vehicle based on the estimated wind speed and the estimated wind direction.

11. The system of claim 10, wherein the modifying the lateral control of the vehicle includes increasing or decreasing a steering offset of the vehicle.

12. The system of claim 10, wherein the modifying the longitudinal control of the vehicle includes increasing or decreasing at least one of: a forward propulsion force or an engine throttle of the vehicle.

13. The system of claim 10, wherein the modifying the route of the vehicle includes selecting an alternative route.

14. The system of claim 10, wherein the estimating the wind speed and the wind direction is in response to at least one of: a predetermined schedule, a weather report, or a determination that a sensor data captured at the vehicle exceeds a predetermined threshold.

15. The system of claim 10, wherein the estimating the wind speed and the wind direction is based on a voting process, wherein the voting process includes selecting a wind speed estimate from a set of wind speed estimates based on a number of votes associated with the wind speed estimate and selecting a wind direction estimate from a set of wind direction estimates based on a number of votes associated with the wind direction estimate.

16. The system of claim 10, wherein the estimating the wind speed and the wind direction is based on a fusion algorithm, wherein the fusion algorithm includes determining a wind speed estimate based on a summation of a set of weighted wind speed estimates and determining a wind direction estimate based on a summation of a set of weighted wind direction estimates.

17. The system of claim 10, wherein the estimating the wind speed and the wind direction includes estimating a lateral wind speed component and a longitudinal wind speed component based on the wind speed and estimating a lateral wind direction component and a longitudinal wind direction component based on the wind direction.

18. A non-transitory, computer-readable storage medium including instructions that, when executed by at least one processor of a computing system, cause the computing system to perform operations comprising: receiving a first set of data including wind speed sensor data captured at a vehicle and a first confidence level associated with the first set of data; prompting a second set of data and a second confidence level associated with the second set of data based on a determination the confidence level fails to satisfy a confidence threshold; estimating a wind speed and a wind direction based on the second set of data in response to a determination the second confidence level satisfies the confidence threshold; modifying at least one of: a lateral control, a longitudinal control, or a route of the vehicle based on the estimated wind speed and the estimated wind direction; and adjusting at least one of: a mirror, or an articulable surface of the vehicle based on the estimated wind speed and the estimated wind direction.

19. The non-transitory, computer-readable medium of claim 18, wherein the modifying the lateral control of the vehicle includes increasing or decreasing a steering offset of the vehicle.

20. The non-transitory, computer-readable medium of claim 18, wherein the modifying the longitudinal control of the vehicle includes increasing or decreasing at least one of: a forward propulsion force or an engine throttle of the vehicle.

21. The non-transitory, computer-readable medium of claim 18, wherein the modifying the route of the vehicle includes selecting an alternative route.

22. The non-transitory, computer-readable medium of claim 18, wherein the estimating the wind speed and the wind direction is in response to at least one of: a predetermined schedule, a weather report, or a determination that a sensor data captured at the vehicle exceeds a predetermined threshold.

23. The non-transitory, computer-readable medium of claim 18, wherein the estimating the wind speed and the wind direction is based on a voting process, wherein the voting process includes selecting a wind speed estimate from a set of wind speed estimates based on a number of votes associated with the wind speed estimate and selecting a wind direction estimate from a set of wind direction estimates based on a number of votes associated with the wind direction estimate.

24. The non-transitory, computer-readable medium of claim 18, wherein the estimating the wind speed and the wind direction is based on a fusion algorithm, wherein the fusion algorithm includes determining a wind speed estimate based on a summation of a set of weighted wind speed estimates and determining a wind direction estimate based on a summation of a set of weighted wind direction estimates.

25. The non-transitory, computer-readable medium of claim 18, wherein the estimating the wind speed and the wind direction includes estimating a lateral wind speed component and a longitudinal wind speed component based on the wind speed and estimating a lateral wind direction component and a longitudinal wind direction component based on the wind direction.

* * * * *